United States Patent
Callaghan

(10) Patent No.: US 7,907,050 B1
(45) Date of Patent: Mar. 15, 2011

(54) POWER SUPPLY COMMUNICATION SYSTEM AND METHOD

(75) Inventor: David M. Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 259 days.

(21) Appl. No.: 12/025,318

(22) Filed: Feb. 4, 2008

Related U.S. Application Data

(62) Division of application No. 10/674,969, filed on Sep. 30, 2003, now Pat. No. 7,327,221.

(51) Int. Cl.
*H04Q 1/30* (2006.01)

(52) U.S. Cl. ... 340/538; 340/540; 340/541; 340/310.15; 714/47; 714/736; 700/16; 700/79

(58) Field of Classification Search .......... 340/538, 340/539, 540, 541, 310.03, 310.06; 714/47, 714/736; 700/79, 16
See application file for complete search history.

(56) References Cited

U.S. PATENT DOCUMENTS

| | | | |
|---|---|---|---|
| 4,556,866 A * | 12/1985 | Gorecki | 375/272 |
| 4,642,607 A * | 2/1987 | Strom et al. | 307/104 |
| 4,851,985 A * | 7/1989 | Burror et al. | 700/79 |
| 4,885,564 A * | 12/1989 | Vercellotti et al. | 370/471 |
| 5,448,229 A * | 9/1995 | Lee, Jr. | 340/870.02 |
| 5,684,826 A | 11/1997 | Ratner | |
| 5,705,974 A | 1/1998 | Patel et al. | |
| 5,796,607 A | 8/1998 | Le Van Suu | |
| 5,805,053 A | 9/1998 | Patel et al. | |
| 6,373,377 B1 | 4/2002 | Sacca et al. | |
| 6,441,723 B1 | 8/2002 | Mansfield et al. | |
| 6,653,933 B2 | 11/2003 | Raschke et al. | |
| 6,759,946 B2 | 7/2004 | Sahinoglu et al. | |
| 2003/0043028 A1 | 3/2003 | Torikai et al. | |
| 2004/0015572 A1 | 1/2004 | Kang | |
| 2005/0144437 A1 | 6/2005 | Ransom et al. | |
| 2005/0267935 A1 | 12/2005 | Gandhi et al. | |

OTHER PUBLICATIONS

G. Bhatti, Z. Sahinoglu, K.A. Peker, J. Guo and F. Matsubara, "A TV-Centric Home Network to Provide a Unified Access to UPNP and PLC Domains", Jan. 2002, 9 pages.

* cited by examiner

*Primary Examiner* — Tai T Nguyen
(74) *Attorney, Agent, or Firm* — Turocy & Watson LLP; R. Scott Speroff; John M. Miller

(57) ABSTRACT

A system and method for configuring and monitoring devices utilizing a power line network is provided herein. Each network device (e.g., programmable logic controller, machine, or sensor) contains a power line interface to facilitate communication over a power line network. The power line interfaces contain at least one unique identifier to distinguish the interface and its associated network device from other devices on the same network and thereby enable device message exchange. The ubiquity of power lines in an industrial environment or any environment for that matter provides an accommodating medium of communication, which the subject invention exploits to set-up, configure, and program industrial control devices connected thereto. Furthermore, the subject invention can utilizes power lines after configuration, during system operation, or upon device failure to monitor, diagnose, and/or predict the health of a system device.

10 Claims, 9 Drawing Sheets

POWER SUPPLY COMMUNICATION SYSTEM AND METHOD

CROSS REFERENCE TO RELATED APPLICATIONS

This application is a divisional of U.S. patent application Ser. No. 10/674,969 filed on, Sep. 30, 2003 entitled "POWER SUPPLY COMMUNICATION SYSTEM AND METHOD" issued as U.S. Pat. No. 7,327,221, the entirety of which is incorporated herein by reference.

TECHNICAL FIELD

The present invention relates generally to electrical systems and machines, and more particularly toward a system and method of power line communication.

BACKGROUND

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Presently, industrial control systems are migrating from proprietary network communications solutions to more open standard networks based upon Internet protocols and standards. However, Internet protocols necessarily require the network to be set-up and properly configured. When setting up and configuring a control system for the first time, such a network has not yet been established. Conventionally, bootstrap protocols alone or in combination with handheld held mini-programmers or personal computers (e.g., laptop) that are physically connected (e.g., via a serial port) to the control system are utilized to configure and set-up a control system. Accordingly there is a need in the art for an improved system and method for network set-up and configuration.

Furthermore, conventional diagnostic systems are in the form of a separate control module which diagnoses problems associated with devices that a controller controls. Such diagnostic systems are not available for use unless the controller and the diagnostic module are functioning properly. Additionally, conventional diagnostic systems are typically not aimed at the controller and its modules. Accordingly, there is a need in the art for a system that monitors the health of a controller and it modules as well as the devices connected thereto, and which does so without interfering with the operation of the controller.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a system and method of configuring, setting-up, programming, monitoring, and diagnosing a device such as an industrial controller utilizing a power line network and interface thereto. Most all-useful devices these days especially in industry are electrical devices. Accordingly, to utilize, operate, or take advantage of the benefits provided by electrical devices they need to be connected to an active power source (AC or DC). The subject invention capitalizes on the existing power infrastructure to facilitated network communications between electrical devices through the lines that provide them with operating power.

In accordance with an aspect of the subject invention industrial controllers and other devices are associated, either internally or externally, with an interface module. The interface module enables a device to utilize the power provided on the power line as well are send and receive messages to electric devices that are connected or plugged in to a power supply. Each one of the interface devices contain uniquely identifying indicia such as a device serial number so as to enable messages to be directed toward and received by particular devices. The subject invention therefore discloses a power line network.

According to one aspect of the invention, the power line network is utilized to facilitate controller set-up, configuration, and/or programming. As disclosed above, conventionally controllers are configured by directly connecting a computer or mini-programmer to the controller via a serial port, for example. Controllers cannot be configured remotely because the network, if there is one, has not yet been configured and physically connected. Power lines, however, are typically always provided and connected to electrical devices, before anything else is done or even contemplated. Accordingly, devices that are connected to power supplies can be configured, set-up, and/or programmed by other devices such as computers by utilizing the existing power lines to facilitate communication. In a power line network computers can be connected to the same power supply communicating in a peer-to-peer network fashion over power lines, for example, or they can interact with the power supply network remotely utilizing the Internet.

In accordance with another aspect of the subject invention, a power line network is employed to enable monitoring and predicting device health. By utilizing the power lines to inconspicuously "tunnel in" to electrically connected devices, diagnostic and prognostic data can be gathered, monitored and analyzed with out burdening the device with such a process and without interfering with the current operation of the device. Whilst the subject invention is very useful in monitoring and analyzing data of a currently operating device, it is even more valuable in diagnosing problems with failed systems or devices. For example, assume a controller failed such that it cannot be properly restarted. Accordingly, a conventional network cannot be started so as to communicate with a diagnostic component. Furthermore, some devices may not even have on-board communication capabilities. Thus, there is no practical method of remotely determining the cause of the failure and a proper fix. Power lines, unlike other connection devices, are typically always connected to a device especially during a trouble-shooting period. Consequently and in accordance with an aspect of the subject invention, another device such as a computer can be employed to communicate with the troubled controller over the power lines to determine the cause of its distress and a possible solution thereto.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system," "device," and "module" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1:
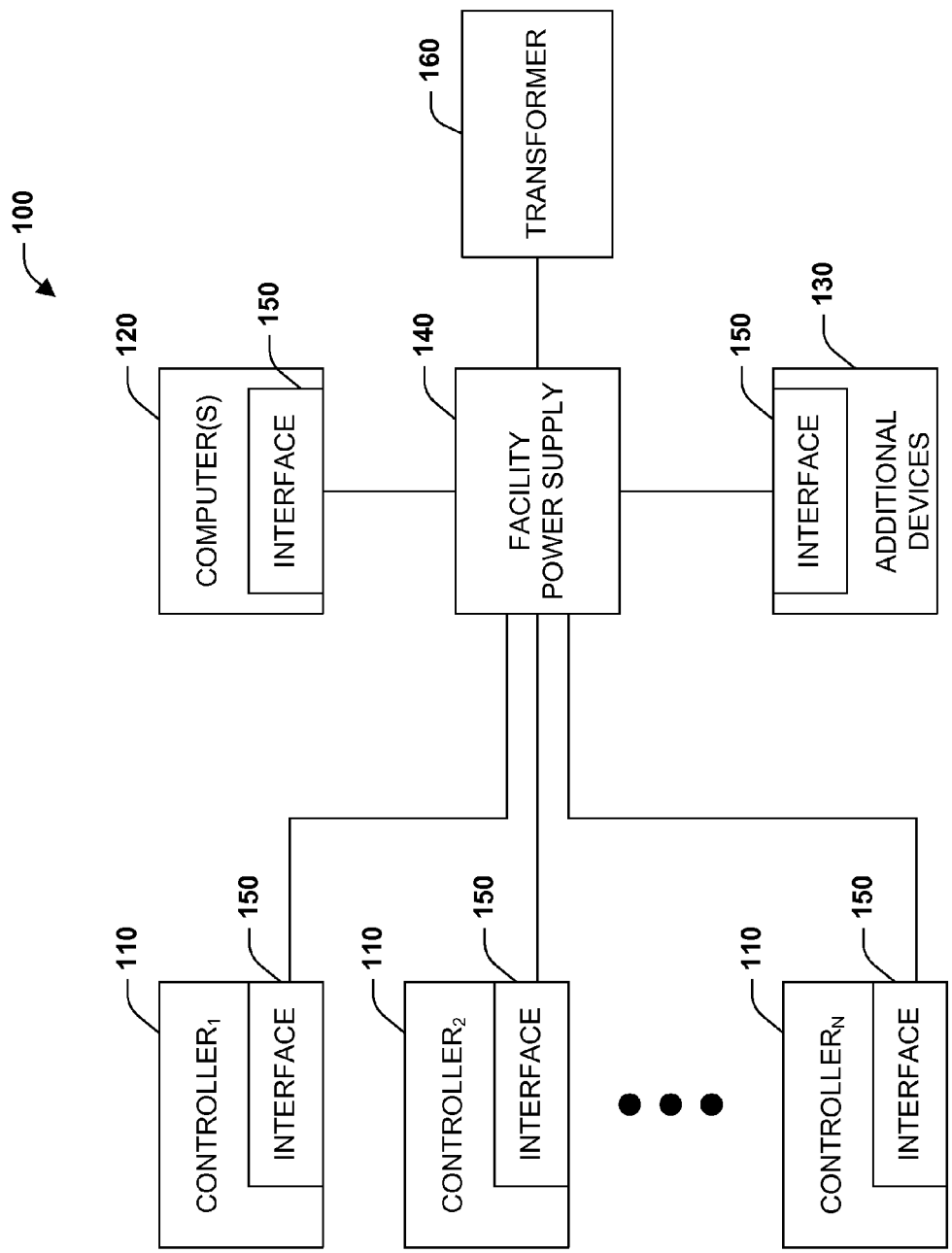
FIG. 1 is a block diagram of a power supply network in accordance with an aspect of the present invention.

Turning initially to FIG. 1, a network communication system 100 is depicted in accordance with an aspect of the subject invention. System 100 comprises a plurality of controllers (CONTROLLER1 through CONTROLLERN, where N is an integer greater than one), computer(s) 120, additionally devices 130, facility power supply 140, interface(s) 150, and transformer 160. Controllers 110 correspond to specialized computers typically utilized in industrial environments for operating and controlling manufacturing operations and machines as described supra. Computer(s) 120 correspond to any device with one more processing units and a memory with which the processor(s) can interact to facilitate program execution. Computer(s) 120 can include but are not limited to personal computers and lap top computers. Furthermore, a plurality of power consuming additional devices 130 of varying functionality and purpose can be included in system 100. Facility power supply 140 receives stepped down power from transformer 160, which receives power from a power supplier (not shown). Facility power supply then distributes electricity through power lines to all power consuming devices in a facility, such as controllers 110, computer(s) 120, and additional devices 130. According to an aspect of the present invention the power lines can also be used as a communications medium between facility devices.

Interface 150 permits communication between devices over power lines. An interface 150 is associated with each device that desires to utilize power lines for communication purposes. Interface 150 can send messages to other devices by generating signals of differing frequencies than that utilized by power and introducing them onto the device's power line. Other devices utilizing an interface 150 can subsequently receive and decode the message over its power line. A variety of methods can be employed to send and receive messages over electrical wires including but not limited to frequency key-shifting and orthogonal frequency-division multiplexing with forward error correction. Furthermore, although interfaces 150 are depicted as being included within each device according to one aspect of the present invention they can also be a separate unit. Accordingly, a power line can be connected to an interface 150 and the data communications connection can be made from interface 150 to particular devices via a serial port, parallel port, Ethernet connection, USB (Universal Serial Bus), FireWire, or the like.

Figure 2:
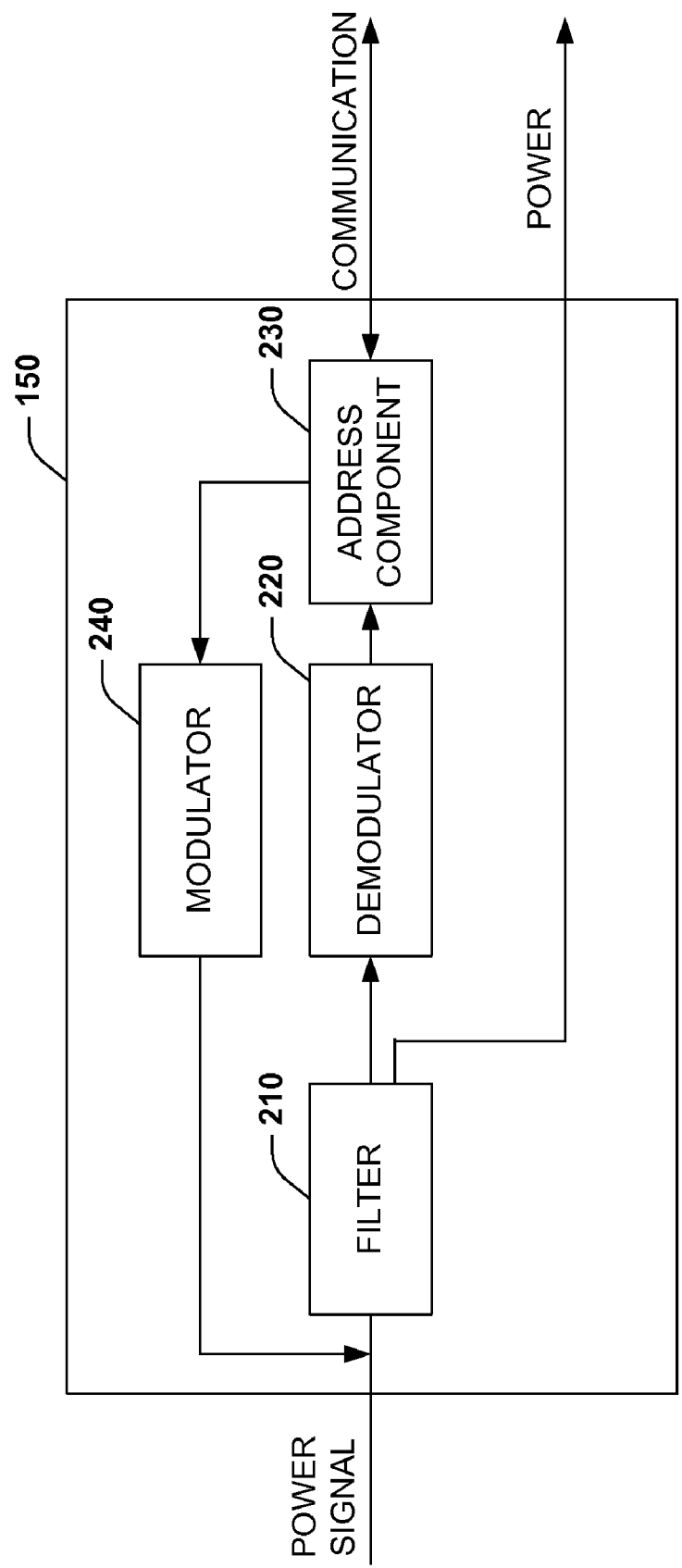
FIG. 2 is a schematic block diagram of an exemplary interface in accordance with an aspect of the present invention.

Turning briefly to FIG. 2, an exemplary interface 150 is illustrated in accordance with an aspect of the present invention. Interface 150 includes filter 210, demodulator 220, address component 230 and modulator 240. Interface 150 receives a power line signal from a power source (not shown). The power signal is input into filter 210 (e.g., band pass filter). Filter 210 thereafter retrieves a communication signal by separating the power signal from the communications signal. For example, power can be transmitted at a low frequency with respect to higher frequency communication data. Accordingly, the filter 210 could separate high and low frequencies outputting the high frequency to modulator 220 and providing the low frequencies to the device as power. The communications output of filter 210 is an analog signal. Demodulator 220 can subsequently receive the analog signal and convert the analog signal to a digital signal. The digital signal is then received by the address component 230. Address component 230, inter alia, houses unique identifying indicia associated with the interface 150 and its related device. Exemplary indicia can include but are not limited to a device serial number and/or a network identification code or number. Such indicia allow the interface 150 and the device associated therewith to be uniquely identified in a power line network environment. Messages sent by devices in a power line network can contain header information attached to the message. Header information can disclose the address (e.g., serial number, network code) of the device intended to receive the message. Address component 230 can read header data to retrieve the destination address. Address component can thereafter compare the destination address with its own address. If the addresses are the same the message was meant to be delivered to the particular device, so the message is passed on to a connected device. If, however, the addresses do not match the message can be discarded. In addition to outputting messages, the address component can also receive them. When address component receives the messages to be sent it can create a header attached to the message into which it writes the destination address and optionally the address of the sending or source device. This new message with network information contained therein can then be utilized as input to modulator 240. Modulator 240 thereafter can convert the digital message into an analog signal of a particular frequency and add the message to the power signal. It is to be appreciated that for purposes of understanding what has been presented is a much simplified description of the interface 150. The scope of the subject invention however is not so limited. The interface can also, for example, contain complex circuitry for dealing with impedance variations, power surges, and signal noise. In addition circuitry can be embedded in interface 150 to improve the quality of the power signal to devices connected thereto. Furthermore, the address component and its associated functionality need not be provided by interface itself. Such functionality can be provided by a device component and thereafter input to the interface 150.

Returning to FIG. 1, in addition to providing power to electric devices by connecting the devices to a power supply such as facility power supply 140, a power line local area network (PLLAN) can also be created. The PLLAN can thereafter be operated as a client-to-server network or as a peer-to-peer network. A client to server network can be setup utilizing a single computer 120 as the network host. All communications between other devices such as controllers 110 would then go through computer 120. Alternatively, the network can be employed as a peer-to-peer network in which a central host computer is not needed nor utilized as in the client-to-server network. In a peer-to-peer network the devices communicate directly with one another over the power lines.

No matter how the network is set-up, utilizing power supply lines to establish a network (PLLAN) is quite beneficial. Network connectivity is quick and easy—just connect a device with an associated interface to a power line. Furthermore, the system is scalable since an almost endless number of devices (with interfaces 150) can be connected to the system by simply running power lines, which needs to be done anyway to provide the system with operating power. Further yet it should be noted that systems can be easily sub-divided and grouped for convenience and access control. In particular, the interface can be configured using hardware, software, or a combination thereof it to create a plurality of virtual networks. According to one aspect of the invention, interfaces 150 can be programmed with a network identification number and an optional password to ensure that certain devices can share information with each other while other devices cannot. Furthermore, interface 150 may use sophisticated security mechanisms such as SSL or DES. For example, the network of FIG. 1 could be divided such that controllers 110 operate on one network while computer(s) 120 associated with business management operate on another "separate" network.

Figure 3:
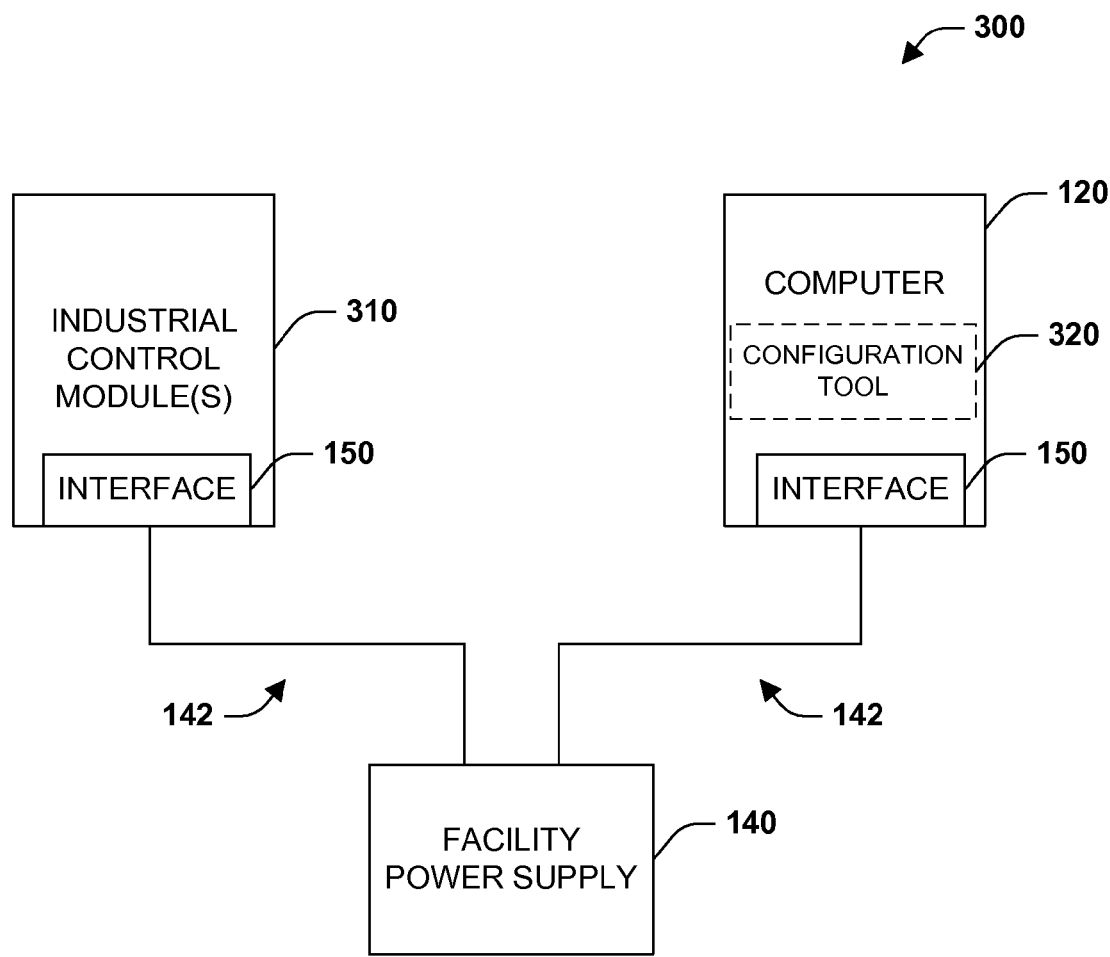
FIG. 3 is a block diagram illustrating a system for configuring industrial control modules in accordance with an aspect of the subject invention.

FIG. 3 illustrates a system 300 for configuring controllers in accordance with an aspect of the present invention. System 300 comprises industrial control module(s) 310, computer 120, configuration tool 320, interfaces 150 and power supply 140. Industrial control modules 310 are individual components communicatively connected and housed in a backplane chassis, which together form an industrial controller or programmable logic controller (PLC). Module(s) 310 provide individualized and specialized functionality that can readily be added or removed from a controller. Typically a controller has a processing module and one or more input/output modules of varying functionality and purpose. Computer 120, as is known in the art typically includes one or more processing units and a memory to facilitate program execution. Computer 120 as well as control module(s) 310 can include interface-components 150. Power supply 140 provides power via power lines 142 to both computer 120 and control module(s) 310. Computer 120 and module(s) 310 utilize power lines 142 and interface components 150 to communicate. According to one aspect of the present invention the computer 120 can be utilized to configure, set-up, and/or program control module(s) 310. Additionally, computer 120 can include substantially any type of hardware and/or software configuration tool 320 (e.g., editing tool, programming tool, browser) that may interact with one or more industrial control modules 310. A computer 120 can utilized tool 320 to create files and/or programs that can be downloaded via power lines to the control module(s) 310.

According to one aspect of the present invention, computer 120 includes a web page configuration tool 320 for configuring one or more web pages that are downloaded in order to exchange data with the industrial control module(s) 310. The data messages from computer 120 can then effect changes on the module configurations and content of web page(s). The tool 320 can include display and input aspects, wherein the web page(s) are created and/or modified. For example, data objects can be associated with the web page (e.g., data objects adapted as pointers to controller data values), the data objects specifying industrial controller data that is to be sent and/or received to and from the industrial control module(s) 310.

After creating the web page(s), and specifying respective data objects thereon, the data can be provided to the control module(s) 310 over the power lines to effect the changes.

Figure 4:
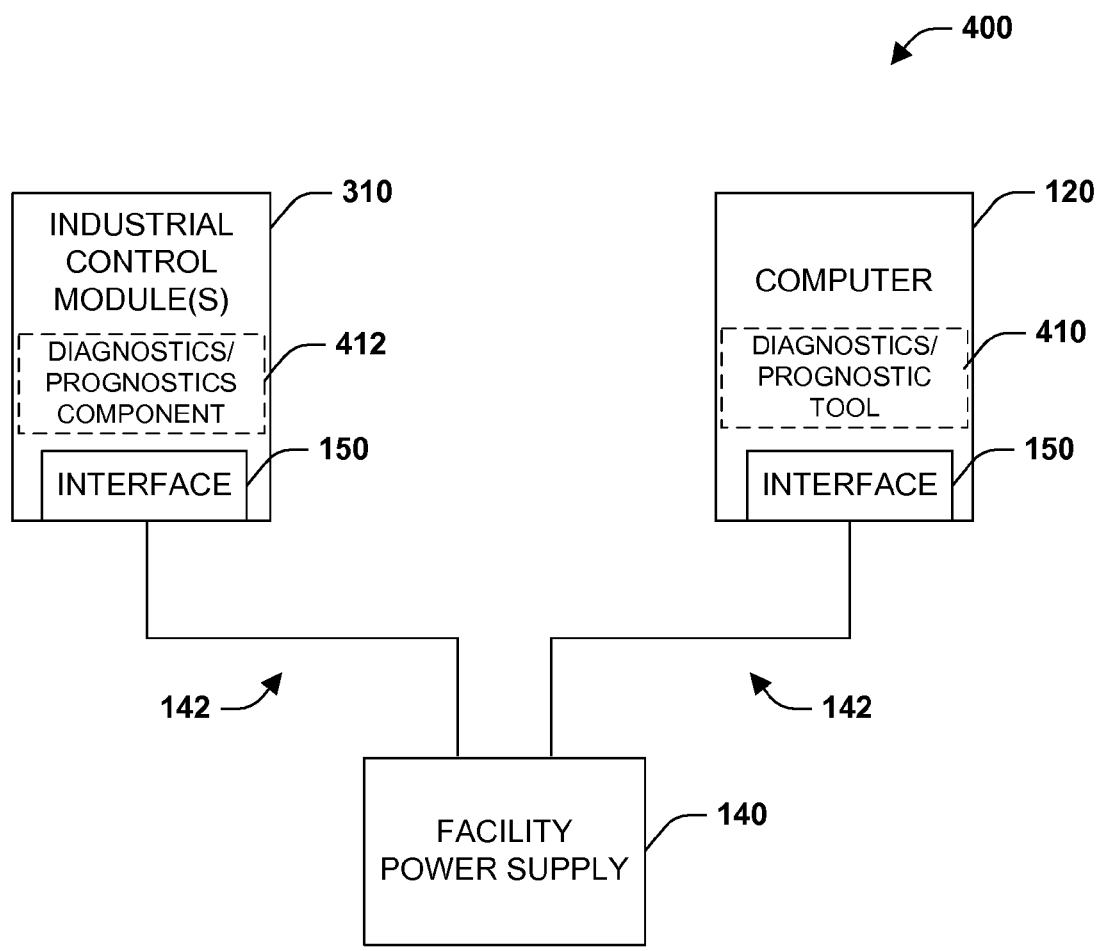
FIG. 4 is a block diagram illustrating a system for monitoring the health of control modules in accordance with an aspect of the present invention.

Turning to FIG. 4, a system 400 for monitoring the health of control modules is illustrated in accordance with an aspect of the subject invention. The system 400 comprises control module(s) 310, computer 120, diagnostic/prognostic data server component 412, diagnostic/prognostic client tool 410, facility power supply 140, power lines 142, and interfaces 150. System 400 is similar to system 300 described above and it is to be appreciated that both systems (i.e., 300 and 400), according to an aspect of the invention, can be combined into a single system comprising the functionality of both. Although not explicitly shown, 410 and 412 may actually consist of both a client and server functionality for data of the diagnostic/prognostic and other data and information. Industrial control modules 310 are individual components communicatively connected and housed in a backplane chassis, which together form an industrial controller or programmable logic controller (PLC). Module(s) 310 provide individualized and specialized functionality that can readily be added or removed from a controller. Typically a controller has a processing module and one or more input/output modules of varying functionality and purpose. Furthermore, it should be noted that although this system is illustrated with a single industrial controller with a plurality of modules the scope of this invention also covers a multitude of controllers with a plurality of modules. Computer 120 is a computer as is known in the art comprising one or more processors and a memory to facilitate program execution. Computer 120 as well as control module(s) 310 can include interface-components 150. Power supply 140 provides power via power lines 142 to both computer 120 and control module(s) 310. Computer 120 and module(s) 310 utilize power lines 142 and interface components 150 to facilitate communication there between. Computer 120 also contains a diagnostic/prognostic client tool 410 for monitoring and predicting the health of control module(s) 310, and communicating with diagnostics/prognostics data server 412 in the module(s). Accordingly, computer 120 can inconspicuously request and receive information over the network established by the power lines 142 concerning the health of module(s) 310 without disturbing a currently running process. Although not explicitly shown, 410 and 412 may actually consist of both a client and server functionality for data of the diagnostic/prognostic and other data and information. It should be appreciated that the subject invention can employ a simple monitoring of various parameters including but not limited to module temperature, current, and voltage. However, the invention can also employ highly sophisticated diagnostic and prognostic data gathering, generation, and analysis techniques. Diagnostic information as employed by the subject invention can be information regarding a condition of module(s) 310 or operating conditions that will accelerate wear and hasten failure of critical elements. Analysis of collected and generated diagnostic information makes it possible to determine or identify an undesirable operating state, when an undesirable operating state is occurring, or when a certain degraded component will result in early failure. Important benefits are possible when diagnostics information is gathered in accordance with the subject invention. First the data monitoring and gathering procedures can occur without the knowledge of the primary system and also without interfering with operating processes. Furthermore, generation of diagnostic and prognostic data enables a system or entity to alter control in response to undesirable conditions and thereby extend the useful operating life of the modules 310. Still further yet, diagnostic/prognostic component 410 can monitor a system for problems that would otherwise be difficult or impossible to detect. For example, assume a system or module will simply not start up properly. Accordingly, it would not be possible for the system to report problems, for instance via another communication component. Furthermore, some devices do not even have the capability to report out system state and health. However, most all devices are connected to a power line 142 which is capable of communicating with the devices thereby facilitating troubleshooting or enabling an automated fix such as down loading a new program or running a diagnostics algorithm on the troubled device.

Figure 5:
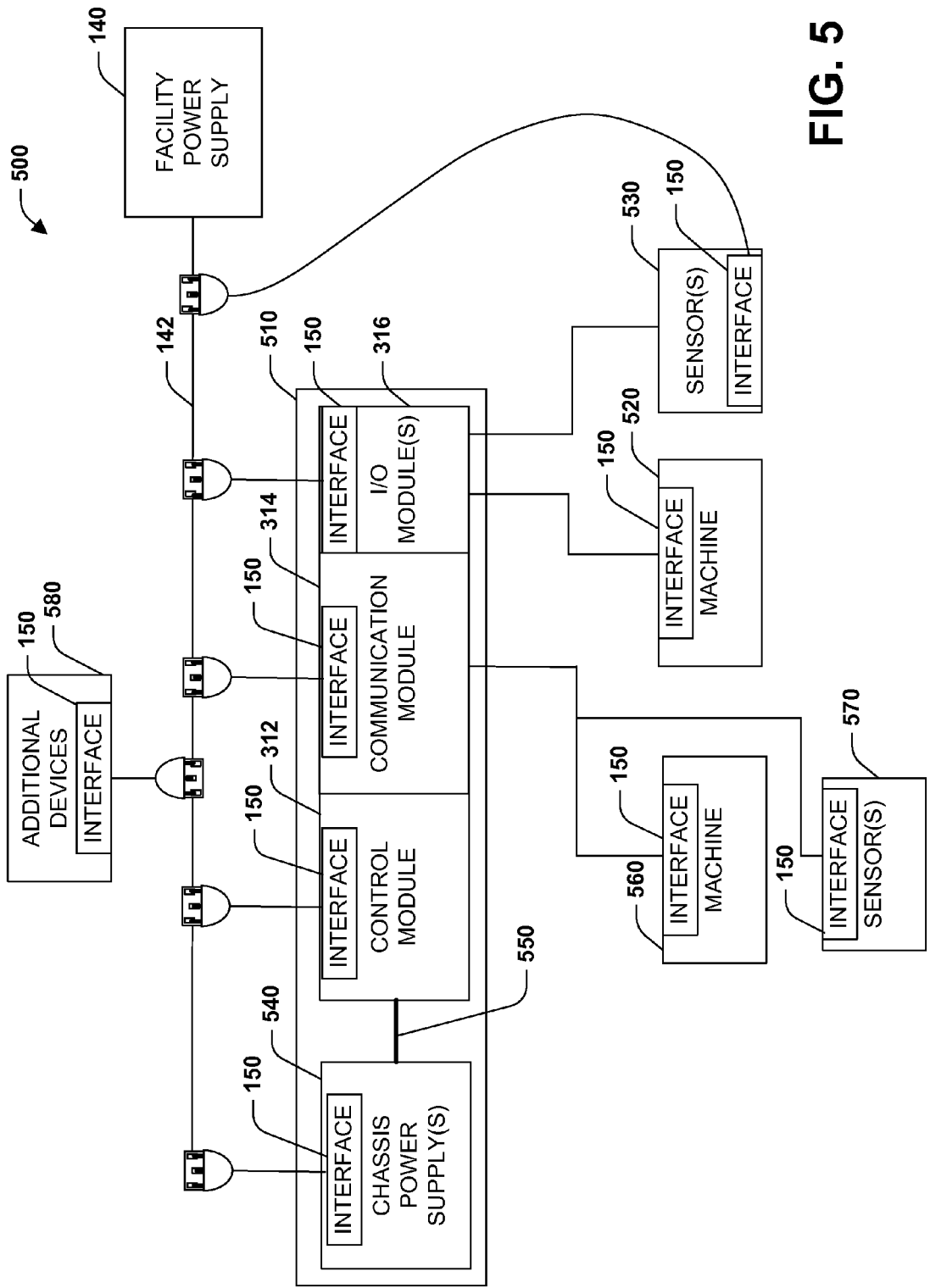
FIG. 5 is a schematic block diagram of a system employing an aspect of the subject invention.

FIG. 5 is a schematic block diagram of an exemplary system 500 employing the present invention in accordance with an aspect of the subject invention. System 500 comprises a facility power supply 140, power line(s) 142, chassis 510, control module 312, communication module 314, input/output (I/O) module(s) 316, machine 520, sensor(s) 530, chassis power supply 540, backplane 550, machine 560, sensor(s) 570, interfaces 150 and additional devices 580. Chassis 510 houses industrial control modules. As shown, chassis 510 houses control module 312, communication module 314, and I/O module(s) 316. Control module 312 gathers, manipulates, and analyzes data provided from I/O module(s) 316 and communication module 314. Communications module 314 provides the conventional means of communicated with other controllers and/or network devices (described in further detail below). Furthermore, control module 312, communication module 314, and I/O module 316 are each associated with an interface 150 and can according to one aspect of the invention be connected to power line network utilizing power line 142. Accordingly, each component is addressable by other components and by other devices connected to the power line 142, for example a computer containing programs for configuring and monitoring each of the modules 312, 314, and 315. According to one aspect of the subject invention each module can connect separately to the power supply via power line 142 to facilitate network communications. However, all the modules need not be directly connected to the power line 142 themselves to be network devices.

Chassis 510 also includes one or more chassis power supply(s) 540 connected to other chassis modules (e.g., control module 312, communication module 314, and I/O module 316) utilizing a backplane 550. A chassis power supply provides power to one or more modules associated with the chassis. Backplane 550 is a physical data communication medium. Backplane 550 facilitates high-speed communication and data exchange between connected components (e.g., control module 312, communication module 314, and I/O modules 316). The high rate of data exchange is enabled by the backplane 550 at least because the backplane has a very large bandwidth and because of the physical proximity of the components (i.e., very close together thus limiting the distance data must travel). According to an aspect of the present invention, chassis power supply is connected to facility power 140 via a power line 142 and an interface 150. Chassis power supply 540, therefore, is operable to receive and transmit communication signals over the power lines. Chassis power supply 540 can then transmit communication signals over the backplane to facilitate communication with and among chassis modules. Hence, one can communicate with control modules using interfaces associated with each module or over the backplane interface.

A similar communication system can be established if a single module is directly connected to the power line utilizing an interface 150. For example, control module 312 could be the only module directly connected to the power line 142.

Control module 312 could then provide power to the other modules 314 and 316 over internally connected power lines, for instance. In this situation, communication module 314 and I/O module(s) 316 could use the power line connecting them to power through controller 312 to receive and transmit messages between and among themselves and over the main power line 142. Alternatively, a single device such as control module 312 could receive communications over a power line network and then rely that information to other modules using the backplane 550.

Machine 520 and sensor(s) 530 are exemplary input/output devices connected to the industrial controller by way of I/O module 316. Machine 520 could be any type of power consuming or power storing device such as a pump or a variable speed motor. I/O modules receive input and produce outputs. Typically, both the inputs and outputs are digital signals, however they do not necessarily have to be. An output module could, for example, distribute power to loads or machines. Machine 520 has an interface 150 associated therewith. Assume for purposes of explanation that the machine 520 is a variable speed motor and an industrial controller regulates the power output to the machine based on a plurality of factors and utilizing I/O module 316. It should be appreciated that communications can be had between machine 520 and controller 312, for instance, utilizing the power line network even though machine 520 is not directly connected to the main power line 142. According to one aspect of the invention, I/O module 316 receives a communication signal from the attached power line 142 utilizing interface 150 or a backplane 550 and subsequently provides such signal to the power lines of its connected devices, namely machine 520. Machine 520 can then send and receive messages to and from I/O module 316 and other power line network devices utilizing interface 150 and the power line providing regulated power to a variable speed motor. Furthermore, it should be noted that power line data communications can be accomplished regardless of whether a device utilizes an AC or a DC power supply. What is significant is the power line connection not the type of power supplied to the device(s) or module(s).

In system 500 I/O module(s) 316 also has a sensor(s) 530 connected thereto so as to receive signals regarding the operation of machine 520, for example. Sensors 530 while connected to I/O module 316 do not rely on the module for power. Rather, sensor(s) 530 are connected directly (e.g., utilizing an extension cord) to the power line. Accordingly, sensor(s) 530 can connect to the power line network directly utilizing interface 150 associated therewith to facilitate communications with other connected devices and/or modules.

Machine(s) 560, sensor(s) 570, and other devices can be connected to a communication module 314 in system 500. Communication module 314 facilitates, inter alia, network communication to computers, other controllers, and I/O components such as machine 560 and sensor(s) 570. Machine 560 and sensor(s) 570 can communicate with the communication module 314 over conventional means such as an Ethernet connection. In addition, machine 560 and sensor(s) 570 can also be connected to communication module 314 utilizing interfaces 150 and power lines between the communication module 314 and the connected devices.

Additionally, it should be appreciated that a device does not have to have any ties to the chassis modules or associated devices to be able to communicate therewith. As long as a device is connected to the same power supply it can communicate directly or indirectly with all components on the network. Additional device 580 is connected to the power supply and is in no other way tied to or associated with chassis modules and/or devices. However, by utilizing interface 150 the additional device can communicate with almost any module or device connected directly or indirectly to the facility power supply 140.

Figure 6:
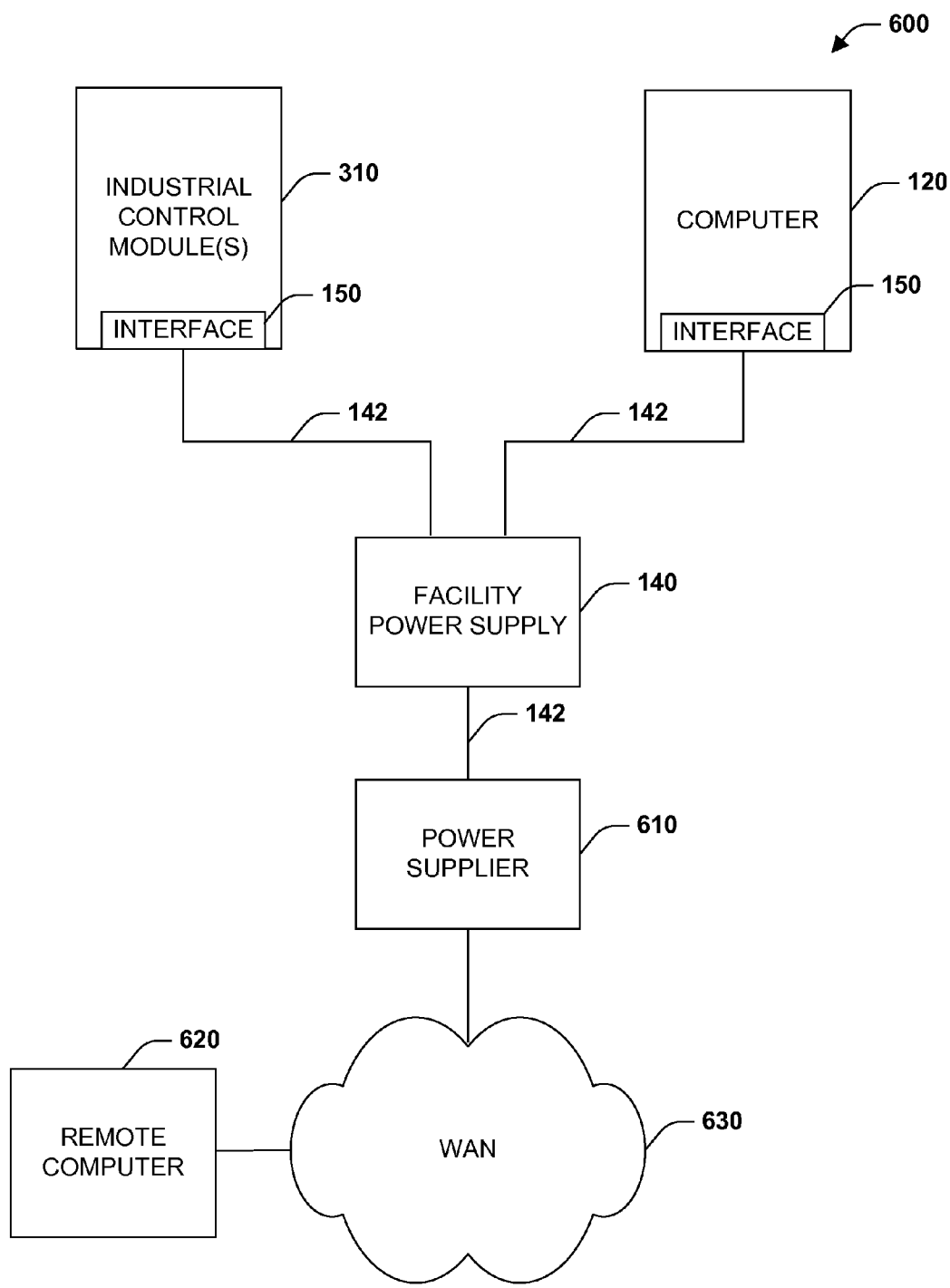
FIG. 6 is a block diagram of a system in accordance with an aspect of the present invention.

Turning to FIG. 6, a system 600 is depicted in accordance with an aspect of the subject invention. System 600 includes industrial control module(s) 310, computer 120, interfaces 150, facility power supply 140, power lines, 142, power supplier 610, remote computer 620, and WAN 630. Industrial control module(s) 310 are individual components communicatively connected and housed in a backplane chassis, which together form an industrial controller or programmable logic controller (PLC). Module(s) 310 provide individualized and specialized functionality that can readily be added or removed from a controller. Computer 120 is a typical computer as is known in the art that including one or more processing units and a memory to facilitate program execution. Computer 120 as well as control module(s) 310 can include interface-components 150. Power supply 140 provides power via power lines 142 to both computer 120 and control module(s) 310. Computer 120 and module(s) 310 utilize power lines 142 and interface components 150 to communicate. Computer 120 can be utilized to configure, set-up, program, and/or monitor and predict the health of control module(s) 310 as wells other devices connected via power lines 142. Additionally, computer 120 can include substantially any type of hardware and/or software tool (e.g., configuration tool, editing tool, programming tool, monitoring tool, diagnostic/prognostic component, browser . . . ) that may interact with industrial control module(s) 310. In accordance with an aspect of the present invention communications between network devices such as control module(s) 310 and computer 120 need not be limited to those devices connected locally to the power line network. Local power line networked devices can also communicate to and from remote devices such as remote computer 620. Remote computer 620 can be set up substantially similar to computer 120 containing hardware and/or software tools to, inter alia, configure and monitor the health of local power line networked devices and/or modules. Remote computer 620 can communicate with local power line networked devices and/or modules utilizing a wide area network (WAN) 630. WANs 630 are communication networks that span a large geographic area (e.g., nationwide, worldwide) and generally consist of the several interconnected local area networks (LANs) and metropolitan area networks (MANs). The largest known WAN 630 known today is the Internet. WAN technologies include, but are not limited to, point-to-point links, circuit switching networks like Integrated Services Digital Networks (ISDN) and variations thereon, packet switching networks, T1 networks, and Digital Subscriber Lines (DSL). WAN 630 can be connected to the local power line network through a power supplier 610. Power supplier 610 (e.g., local utility company) conventionally merely supplies power to a customer such as facility power supply 140. However, power supplier can also operate as a link to wide area network 630 for example by receiving and transmitting network communications over a power line 142 between itself and one or more facility power supplies 140.

Figure 7:
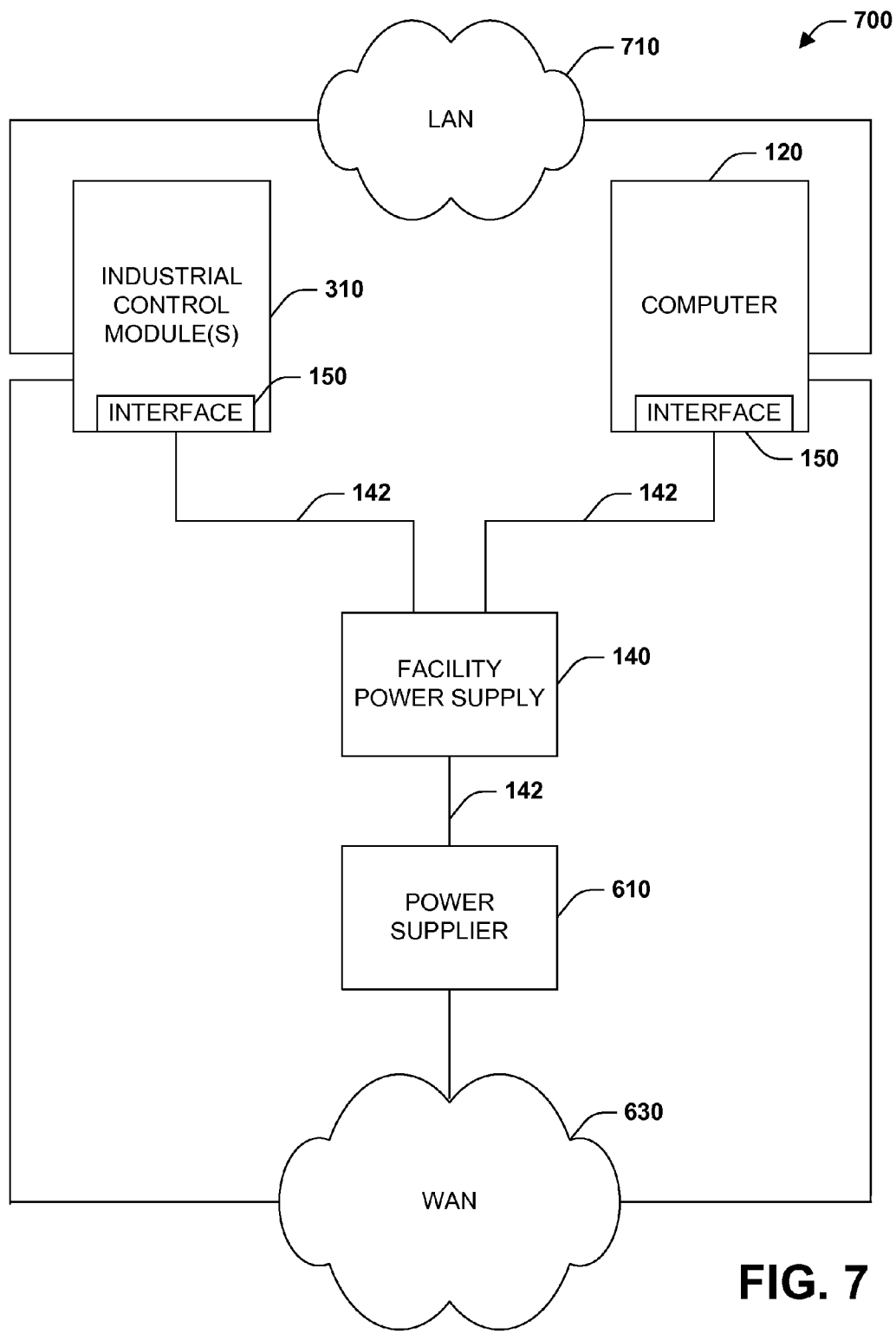
FIG. 7 is a block diagram of a system in accordance with an aspect of the subject invention.

FIG. 7 illustrates a system 700 according to an aspect of the subject invention. System 700 comprises industrial control module(s) 310, computer 120, interfaces 150, facility power supply 140, power lines, 142, power supplier 610, WAN 630, and LAN 710. Similar to system 600 supra, industrial control modules 310 are individual components communicatively connected and housed in a backplane chassis, which together form an industrial controller or programmable logic controller (PLC). Modules 310 provide individualized and specialized functionality that can readily be added or removed from a controller. Computer 120 is a computer as is known in the art that includes one or more processing units and a memory to facilitate program execution. Computer 120 as well as control module(s) 310 can include interface-components 150. Power supply 140 provides power via power lines 142 to both computer 120 and control module(s) 310. Computer 120 and module(s) 310 utilize power lines 142 and interface components 150 to communicate. Computer 120 can be utilized to configure, set-up, program, and/or monitor and predict the health of control modules 310 as wells other devices connected via power lines 142.

Although the established power line network, can be utilized as the primary and/or sole network connection, according to one aspect of the invention it is utilized as secondary means of communication. Industrial controllers and associated module(s) 310 as well as computer 120 can be connected to WAN 630 via facility power supply 140 and power supplier 610 as described above with respect to system 600 (FIG. 6). However, control module(s) 310 and computer 120 can also be connected to WAN 630 utilizing other network connectivity devices (e.g., modem, cable modem, DSL, Ethernet ... ) and any one of a multitude of WAN technologies. WAN technologies include, but are not limited to, point-to-point links, circuit switching networks like Integrated Services Digital Networks (ISDN) and variations thereon, packet switching networks, T1 networks, and Digital Subscriber Lines (DSL). Furthermore, control module(s) 310 and computer 120 can be connected to another local area network (LAN) 710 using lines other than the power lines (e.g., twisted pair, coaxial cable, optical fiber ... ), a connection device, (e.g., modem, network interface card (NIC) ... ) and one of a variety of LAN technologies. LAN technologies can include but are not limited to Fiber Distributed Data Interface (FDDI), Copper Distributed Data Interface (CDDI), Ethernet/IEEE 1102.3, Token Ring/IEEE 1102.5, physical connection topologies such as bus, tree, ring, and star, and the like. Therefore, industrial controllers and associated module(s) 310, computer 120, and other devices can rely on connections other than those made through the power lines to communicate control signals to effectuate system operation and facilitate diagnostic testing and automated control based thereon. One of the many advantages of the subject invention is that the power line network can be used to configure, set-up, or otherwise program devices that do not have other such communicative capacities and/or devices that do have communicative capacity but have not yet been set-up. Additionally and/or alternatively, the power line network can be utilized as an independent secondary communication system. As a secondary communication system a power line network can be employed to provide behind the scenes testing and monitoring of components without interfering with the primary operations and communications of the system. For example, while a control module 310 is managing a load associated with a variable speed motor, computer 120 can monitor various parameters associated with the health of the control module including but not limited to module temperature, fan speed, voltage, and current, utilizing power lines 142. Such information can subsequently be employed to diagnose a system fault, predict the remaining operating lifetime of the control module, and/or alert an appropriate entity of an impeding failure.

Figure 8:
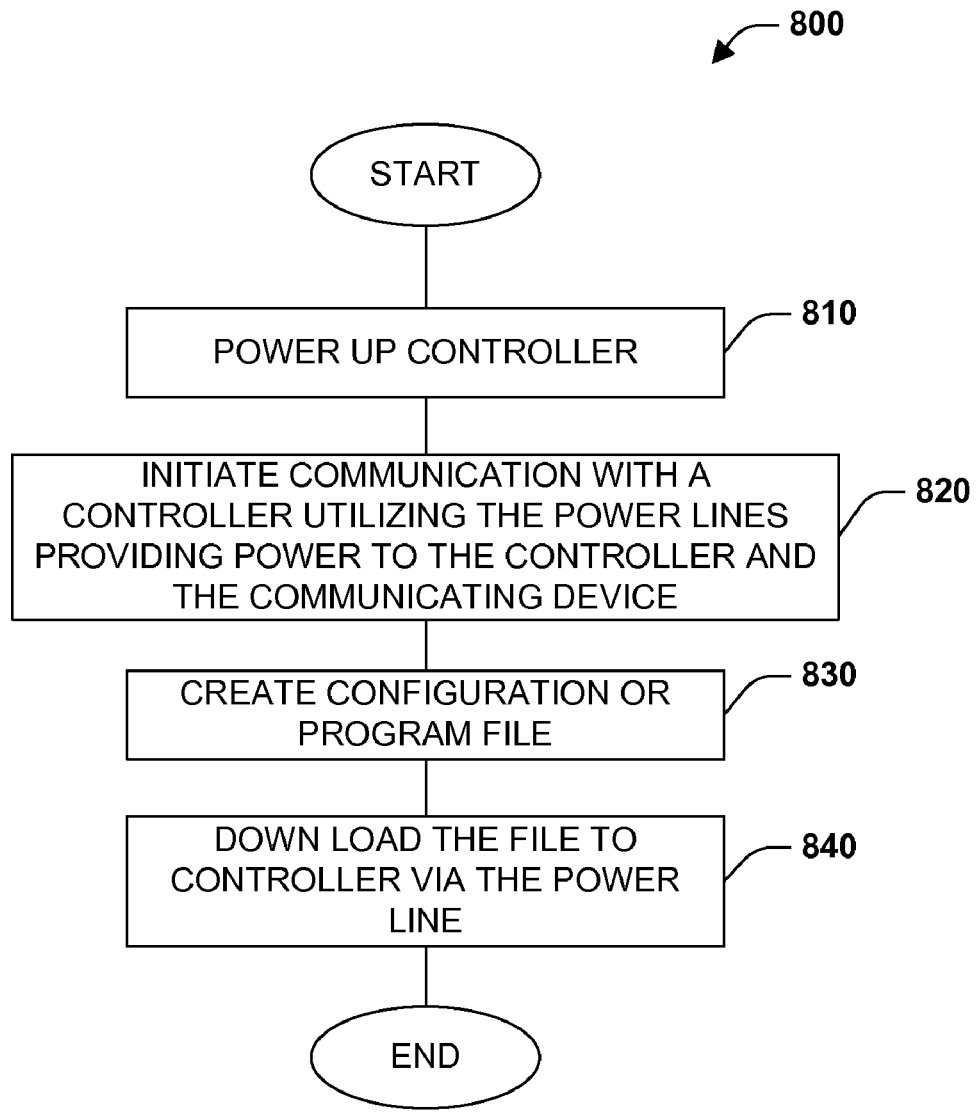
FIG. 8 is a flow chart diagram of a method of configuring or programming a controller in accordance with an aspect of the present invention.
Figure 9:
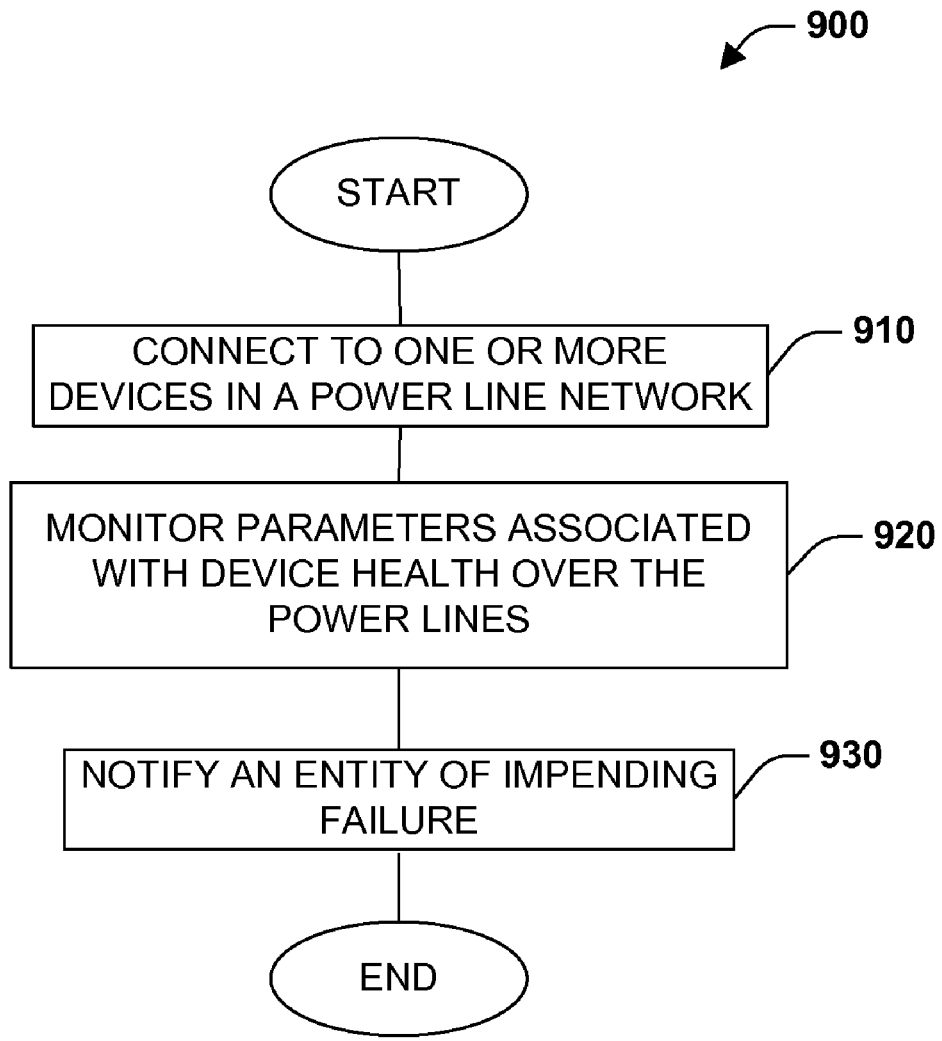
FIG. 9 is a flow chart diagram of a method of monitoring device health in accordance with an aspect of the subject invention.

In view of the exemplary systems described supra, a methodology that may be implemented in accordance with the present invention will be better appreciated with reference to the flow charts of FIGS. 8 and 9. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Turning to FIG. 8, a methodology 800 of configuring or programming a controller is depicted in accordance with an aspect of the present invention. At 810 a controller is powered up, by connecting it to an active power supply. At 820, communications are initiated with the controller over power lines associated with the controller and the communicating device (e.g., computer). Such communication can correspond to a computer simply pinging a control device to verify that the control device is connected to the network or the communication can be much more elaborate. Subsequently, at 830 a configuration or program file is created. The file contains information about various control parameters and can be a list of settings that the controller inputs and updates or it can be a more complex program or executable (e.g., ladder logic, webpage ... ). Finally, the created file or executable can be downloaded or otherwise transferred from one device (e.g., computer) to a controller or control module(s) via the power lines, at 840. Furthermore, it should be appreciated that the creation and transferring of a file or executable does not have to be completed all at once. Having established communication with a controller at 820 a computer or other communicating device can interact with a controller in real-time (sending and requesting information) to facilitate controller set up or programming.

FIG. 9 is a flow chart diagram depicting a method of monitoring and diagnosing device health in accordance with an aspect of the subject invention. At 910, a computer of other monitoring device is connected to the one or more devices in a power line network. The computer or monitoring device can be a member of the power line network such that communications are completed solely over the power lines or the computer or monitoring device can be located remotely wherein only a part of the communications are over the power lines. At 920, parameters associated with one or more power line network devices are monitored by a computer or other monitoring device(s). Subsequently, an entity (e.g., a human being, computer, group, or combination thereof) is notified of an impending failure as diagnosed and predicted by the monitoring device. Finally, it should be appreciated that notification can be completed utilizing the power lines and associated network devices.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for monitoring the health of electrical devices comprising:
   a diagnostic component;
   an electrical device, wherein the electrical device is at least one of a programmable logic controller (PLC) module, a control module, an input module, or an output module;
   power lines connecting the diagnostic component to the electrical device, wherein the diagnostic component monitors one or more health parameters of the electric device utilizing the power lines, wherein the power lines provide power to and communication between the diagnostic component and the electric device;
   a plurality of interfaces, where each of the diagnostic component and the electrical device has an associated interface from the plurality of interfaces to enable the communication between the diagnostic component and the electrical device over the power lines; and
   one or more sensors, wherein the power lines connect the electrical device to the one or more sensors, the power lines provide power to the one or more sensors, the electrical device communicates with the one or more sensors via the power lines.

2. The system of claim 1, wherein the interfaces retrieve a communication signal imposed on a power signal transferred over the power lines.

3. The system of claim 2, wherein each interface of the plurality of interfaces has a unique identifying indicia that allows the interface to be uniquely identified over the power lines.

4. The system of claim 1, further comprising one or more machines, wherein the power lines connect the electrical device to the one or more machines, the power lines provide power to the one or more machines, the electrical device communicates with the one or more machines via the power lines.

5. The system of claim 1, wherein power is transmitted at a low frequency over the power line and a communication signal for the communication is transmitted at a frequency higher than the low frequency over the power line.

6. A system for monitoring the health of electrical devices comprising:
   a diagnostic component;
   an electrical device, wherein the electrical device is at least one of a programmable logic controller (PLC) module, a control module, an input module, or an output module;
   power lines connecting the diagnostic component to the electrical device, wherein the diagnostic component monitors one or more health parameters of the electric device utilizing the power lines, wherein the power lines provide power to and communication between the diagnostic component and the electric device; and
   a plurality of interfaces, where each of the diagnostic component and the electrical device has an associated interface from the plurality of interfaces to enable the communication between the diagnostic component and the electrical device over the power lines; and
   one or more machines, wherein the power lines connect the electrical device to the one or more machines, the power lines provide power to the one or more machines, the electrical device communicates with the one or more machines via the power lines.

7. The system of claim 6, wherein the interfaces retrieve a communication signal imposed on a power signal transferred over the power lines.

8. The system of claim 7, wherein each interface of the plurality of interfaces has a unique identifying indicia that allows the interface to be uniquely identified over the power lines.

9. The system of claim 6, further comprising one or more sensors, wherein the power lines connect the electrical device to the one or more sensors, the power lines provide power to the one or more sensors, the electrical device communicates with the one or more sensors via the power lines.

10. The system of claim 6, wherein power is transmitted at a low frequency over the power line and a communication signal for the communication is transmitted at a frequency higher than the low frequency over the power line.

* * * * *